US008621221B1

(12) United States Patent
Arnold et al.

(10) Patent No.: US 8,621,221 B1
(45) Date of Patent: Dec. 31, 2013

(54) METHOD AND SYSTEM FOR EVENT NOTIFICATION FOR WIRELESS PDA DEVICES

(75) Inventors: Greg Arnold, Sunnyvale, CA (US); Fermin Soriano, Sunnyvale, CA (US)

(73) Assignee: Palm, Inc., Sunnyvale, CA (US)

( * ) Notice: Subject to any disclaimer, the term of this patent is extended or adjusted under 35 U.S.C. 154(b) by 1123 days.

(21) Appl. No.: 11/011,623

(22) Filed: Dec. 13, 2004

Related U.S. Application Data

(63) Continuation of application No. 09/944,855, filed on Aug. 31, 2001, now Pat. No. 6,842,628.

(51) Int. Cl.
*H04L 9/32* (2006.01)

(52) U.S. Cl.
USPC ........................................................ 713/176

(58) Field of Classification Search
USPC ........................................................ 713/176
See application file for complete search history.

(56) References Cited

U.S. PATENT DOCUMENTS

| | | | |
|---|---|---|---|
| 5,010,547 A | 4/1991 | Johnson | |
| 5,012,219 A | 4/1991 | Henry | |
| 5,075,684 A | 12/1991 | DeLuca | |
| 5,359,317 A | 10/1994 | Gomez | |
| 5,394,140 A | 2/1995 | Wong | |
| 5,430,436 A | 7/1995 | Fennell | |
| 5,612,682 A | 3/1997 | DeLuca | |
| 5,650,776 A | 7/1997 | Mitchell | |
| 5,705,995 A | 1/1998 | Laflin | |
| 5,903,852 A | 5/1999 | Schaupp, Jr. | |
| 5,958,006 A | 9/1999 | Eggleston | |
| 6,157,630 A | 12/2000 | Adler | |
| 2002/0032853 A1* | 3/2002 | Preston et al. | 713/151 |
| 2002/0087862 A1* | 7/2002 | Jain et al. | 713/176 |
| 2004/0213283 A1* | 10/2004 | Ohkubo et al. | 370/462 |

* cited by examiner

*Primary Examiner* — Edan Orgad
*Assistant Examiner* — Harris Wang (57) ABSTRACT

A method for transmitting verified notification messages from a service provider to a PID (personal information device) user. The method includes the step of registering a plurality of users and providing each of the users with respective public and private encryption keys. A message is then received from a first user of the plurality of users. The received message is signed with the first user's private encryption key. A signature of the message is verified by using the first user's public encryption key. The authority of the first user to transmit notification messages is then verified. The message is then resigned with the second user's private encryption key and transmitted to at least a second user of the plurality of users, wherein the second user verifies the signature by using the second user's public encryption key. Thus, the encryption provides a reliable means for differentiating between regular notifications and emergency notifications and is secure for authenticating and authorizing the messages sent from the service provider. A priority can be assigned to the message in accordance with a priority indicated by the first user. The message can be transmitted with the assigned priority to the second user, thereby allowing the second user to process the message in accordance with the assigned priority. The encryption keys can be stored in a database of the service provider.

36 Claims, 4 Drawing Sheets

METHOD AND SYSTEM FOR EVENT NOTIFICATION FOR WIRELESS PDA DEVICES

CROSS-REFERENCE TO RELATED APPLICATION

This application is a Continuation of U.S. patent application Ser. No. 09/944,855, filed on Aug. 31, 2001, now U.S. Pat. No. 6,842,628, entitled "METHOD AND SYSTEM FOR EVENT NOTIFICATION FOR WIRELESS PDA DEVICES," by Arnold, et al., and assigned to the assignee of the present application, which is herein incorporated by reference.

TECHNICAL FIELD

The present invention relates to a system and method for transmitting messages to a personal information device ("PID"). In particular, the present invention relates to a system and method for reliably and securely transmitting messages to PIDs.

BACKGROUND ART

Personal Information Devices include the class of computers, personal digital assistants and electronic organizers that tend both to be physically smaller than conventional computers and to have more limited hardware and data processing capabilities. PIDs include, for example, products sold by Palm, Inc. of Santa Clara, Calif., under such trademark as Pilot, and Pilot 1000, Pilot 5000, PalmPilot, PalmPilot Personal, PalmPilot Professional, Palm, and Palm III, Palm V, Palm VII, as well as other products sold under such trade names as WorkPad, Franklin Quest, and Franklin Convey.

PIDs are generally discussed, for example, in U.S. Pat. Nos. 5,125,039; 5,727,202; 5,832,489; 5,884,323; 5,889,888; 5,900,875; 6,000,000; 6,006,274; and 6,034,686, which are incorporated herein by reference. PIDs typically include a screen and data processor, allowing the PID user to operate a substantial variety of application relating to, for example: electronic mail, a calendar, appointments, contact data (such as address and telephone numbers), notebook records, a calendar, expense reports, to do lists: or games. PIDs also often include substantial electronic memory for storing such applications as well as data entered by the user. Due to their substantial variety of applications and uses, personal information devices are becoming increasingly widely used.

One increasingly popular application of personal information devices is their ability to share information with other properly equipped personal information devices, wirelessly and otherwise. For example, many types of user information such as electronic mail, calendar events, appointments, contact data, and the like exist in the form of digital data files stored within the memory of the personal information device. When equipped with communications hardware/software, the data files embodying the user information can be easily transferred from one personal information device to another. For example, one such application involves the transferring of electronic "business cards" from one personal information device to another, allowing their respective users to easily exchange contact information.

The popularity of information sharing between PIDs and other types of electronic devices is gaining with the increasingly widespread adoption of wireless forms of communication. Wireless communication allows users, via their respective devices, to always be in touch with one another. For example, instant messaging applications are very popular on desktop computer systems. Instant messaging allows users to instantly contact one another when they're both online. A similar scenario is envisioned where users are both carrying wirelessly connected PIDs.

Accordingly, several prior art solutions are emerging which address the popularity of wireless instant messaging type schemes. These solutions enable a wirelessly connected PID to receive messages, e-mail, notifications, or the like from other wirelessly connected PIDs or other types of computer system platforms (e.g., desktop machines connected to messenger services, cell phones, and the like).

Unfortunately, these prior art solutions do not address the problem of unsolicited notifications, unprioritized notifications, unsolicited e-mail, and other types of "spam" which exploit the wireless functionality of a user's PID. For example, many users have experienced frustration when unsolicited e-mail and/or unsolicited notifications appear within their mail browsers or instant messenger services.

Currently, many wireless notifications/messages carry the same priority, and are thus treated the same by the PID. For example, users may want to distinguish regular notifications (e.g. for stock alerts) from emergency notifications (e.g., your patient is in need of critical care). There currently exists no viable method which allows a user to distinguish between wanted messages/notifications and unwanted spam Thus, many users may, for example, turn wireless notification functionality off in order to prevent unauthorized/unsolicited use.

The lack of message prioritization is a serious drawback to prior art wireless notifications/messaging schemes. Although wireless PDA devices provide service providers with the ability to push notifications to the user when a pre-defined event takes place, there is no viable method for differentiating between "regular" alerts and "emergency" alerts. For example, a user could configure the PID to filter regular alerts while allowing emergency alerts to be displayed. For example, in a case where a surgeon is attending a concert, she may want to turn off notification of "regular" alerts but allow for the notification of "emergency" alerts. She will also want to have control over who can send her "emergency" alerts. Considering a case where a service provider offers an earthquake alert service, which notifies the subscribers of the arrival of an earthquake giving them a few precious seconds in which they can act before the earthquake hits. A person subscribed to this service and attending a meeting may choose to ignore "regular" notifications but will want to view this "emergency" alert.

The prior art provides no method for differentiating between such regular notifications and emergency notifications. The prior art provides no method for ensuring a user that a so-called notification is not simply spam (e.g., "buy this product now at a 20% off sale!"). The prior does not provide any mechanism or scheme for authenticating and authorizing the content service provider to issue such priority differentiated messages.

Thus, what is required is a method for differentiating between such regular notifications and emergency notifications. What is required is a method for ensuring a user that a so-called notification is not simply spam. Additionally, what is required is a method and system for authenticating and authorizing the content service provider to issue such priority differentiated messages. The present invention provides a novel solution to the above requirements.

DISCLOSURE OF THE INVENTION

The present invention is a method and system for event notification for wireless devices. The present invention provides a method for differentiating between such regular notifications and emergency notifications. The present invention provides a method for ensuring a user that a so-called notification is not simply spam. Additionally, the present invention provides a method and system for authenticating and authorizing the content service provider to issue such priority differentiated messages.

In one embodiment, the present invention is implemented as method for transmitting verified notification messages from a service provider (e.g., a wireless message service provider) to a PID (personal information device) user. The method includes the step of the service provider registering a plurality of users and providing each of the users with respective public and private encryption keys. A message is then received from a first user of the plurality of users. The received message is signed with the first user's private encryption key. A signature of the message is verified by using the first user's public encryption key. The authority of the first user to transmit notification messages is then verified. The message is then transmitted to at least a second user of the plurality of users, wherein the second user verifies the signature by using the second user's public encryption key. For each intended recipient, a copy of the message is then signed with the recipient's private encryption key and sent, wherein the recipient verifies the signature by using the recipient's public encryption key.

Thus, the encryption provides a reliable means for differentiating between regular notifications and emergency notifications and is secure for authenticating and authorizing the messages sent from the service provider. A priority can be assigned to the message in accordance with a priority indicated by the first user. The message can be transmitted with the assigned priority to the second user, thereby allowing the second user to process the message in accordance with the assigned priority. The encryption keys can be stored in a database of the service provider. A message digest can be generated and encrypted with the first user's private encryption key to generate the signature. The signature can be decrypting using the first user's public encryption key and the message digest. This ensures, for example, that a so-called notification is not simply spam.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Embodiments of the present invention are directed towards a method and system for event notification for wireless devices. The embodiments of the present invention provide a method for differentiating between such regular notifications and emergency notifications. The embodiments of the present invention provide a method for ensuring a user that a so-called notification is not simply spam. Additionally, embodiments of the present invention provide a method and system for authenticating and authorizing the content service provider to issue such priority differentiated messages. Embodiments of the present invention and their benefits are further described below

Notation and Nomenclature

Some portions of the detailed descriptions which follow are presented in terms of procedures, steps, logic blocks, processing, and other symbolic representations of operations on data bits within a computer memory. These descriptions and representations are the means used by those skilled in the data processing arts to convey most effectively the substance of their work to others skilled in the art. A procedure, computer executed step, logic block, process, etc., are here, and generally, conceived to be self-consistent sequences of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing," "examining," "accessing," "routing," "determining," "transmitting," "storing," or the like, refer to the action and processes of a computer system, or similar electronic computing device, that manipulates and transforms data represented as physical (electronic) quantities within the computer system's registers and memories into other data similarly represented as physical quantities within the computer system registers or memories or other such information storage, transmission, or display devices (e.g., computer system 412 of FIG. 4).

Method and System of the Invention

Figure 1:
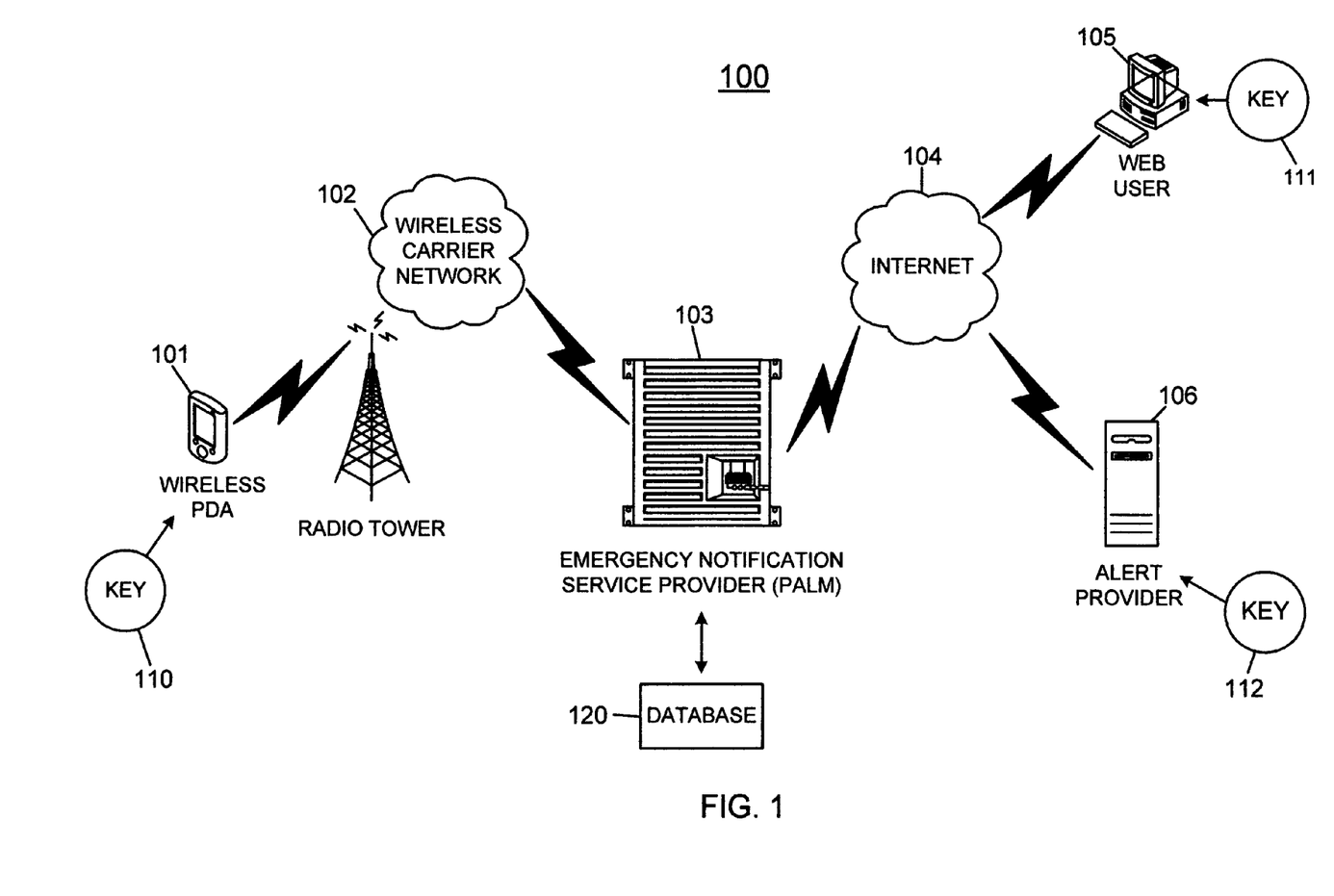
FIG. 1 shows a diagram of an event notification system in accordance with one embodiment of the present invention.

FIG. 1 shows a diagram of an event notification for wireless devices 100 in accordance with one embodiment of the present invention. System 100 depicts and emergency notifications service provider 103 connected to a wireless carrier network 102 and the Internet 104. The service provider 103 is connected to a Web user 105 and an alert provider 106 via the Internet 104. Service provider 103 is similarly connected to a wireless PID 101 via the wireless carrier network 102.

In general, system 100, in accordance with the present invention, implements a method and system for event notification for wireless devices. System 100 provides a method allowing service provider 103 to push notifications to PID users (e.g., PID user 101) when a pre-defined event takes place. System 100 also provides for the differentiation between "regular" alerts and "emergency" alerts. For example, considering a situation where a surgeon is attending a concert, the surgeon may want to turn off notification of "regular" alerts but allow for the notification of "emergency" alerts. The surgeon will also want to have control over who can send "emergency" alerts. As an additional example, considering a situation where a service provider offers an earthquake alert service, which notifies the subscribers of the arrival of an earthquake giving them a few precious seconds in which they can act before the earthquake hits, a person subscribed to the notification service of the present invention and attending a meeting may choose to ignore "regular" notifications but will want to view this "emergency" alert. System 100 provides the mechanism for authenticating and authorizing the content service provider to issue these emergency alerts.

Thus, system 100 in accordance with the present invention overcomes prior art limitations with respect to prior art wireless notifications carrying the same priority and being substantially un-differentiated. System 100 provides for authentication and an authorization of emergency notification requests, the detection of tampering of the text of the notification message, and the protection of the wireless PID device users from multiple re-sends of the same notification message (replay attacks).

Referring still FIG. 1, a main component of emergency notification functionality of the present invention is provided by the emergency notification service provider 103. Service provider 103 handles the registration of users and groups, contains information mapping a user account to a wireless PID device, and authenticates, authorizes and forwards emergency notification alerts to the users' devices. PID 101 is the recipient of the emergency notifications. It can also send emergency notifications to other wireless PID devices. The Web user 105 sends emergency notification requests to a specific user or a group of users via the Emergency Notification Service Provider. The Alert Provider 106 offers a service by which users or a group of users can be notified upon an emergency. It sends the emergency notification to a specific user or group of user via the service provider 103. The wireless carrier network 102 retransmits the messages from the service provider 103 and from any PIDs (e.g., PID 101) within transmission range. The wireless carrier network 102 thus extends the service range over a large geographical area.

It should be noted that in a simplified embodiment, the wireless carrier network 102 can be omitted. In such embodiment, messages would be transmitted within the range of the individual devices (e.g., PID 101, service provider 103, etc.).

The registration process for using the emergency notification service of the present invention is now described.

In the present embodiment, in order to use the notification service, the owner of the wireless PID 101 must subscribe to the notification service. For example, those users wanting the emergency notification service of the present invention would register with service provider 103. Upon registration, a public/private key pair (e.g., keys 110, 111, and 112) would be generated by service provider 103. One key is used to encrypt while the other is used to decrypt. The public and private keys would be stored on the service provider's database 120 and in the user's wireless device.

In the present embodiment, service provider 103 aggregates emergency services among many "Alert Providers" such as alert provider 106. These providers would subscribe to the Emergency Service in the same way as a regular user (e.g., wireless PID 101). In one embodiment, the public/private key pairs would be generated by the service provider 103 and stored on a coupled database 120. The alert providers would also receive and store the private keys.

The Web user 105 similarly registers at the service provider 103 for the purpose of sending emergency alerts to registered wireless PDA device users (e.g., wireless PID 101). Service provider 103 generates a public/private key pair 111 for the Web user 105. In one embodiment, the public key would be stored on the database 120. The private key would be stored by Web user 105 (e.g., on the user's desktop). These Web connected users (e.g., Web user 105) would only be able to send emergency notification requests, not receive them.

In the present embodiment, service provider 103 would provide each subscriber with the ability to manage a list of users or groups that are allowed to submit emergency requests. The user may choose to allow all emergency notifications come to the device or may want to restrict access to certain users or groups of users.

In the present embodiment, service provider 103 would offer a mechanism to create and manage a group of registered users. For example, during the creation of the group, one or more existing subscribers would be designated as administrators of the group and would maintain the group (e.g., adding members, deleting members, etc.).

The emergency notification process of the present invention is now described.

Figure 2:
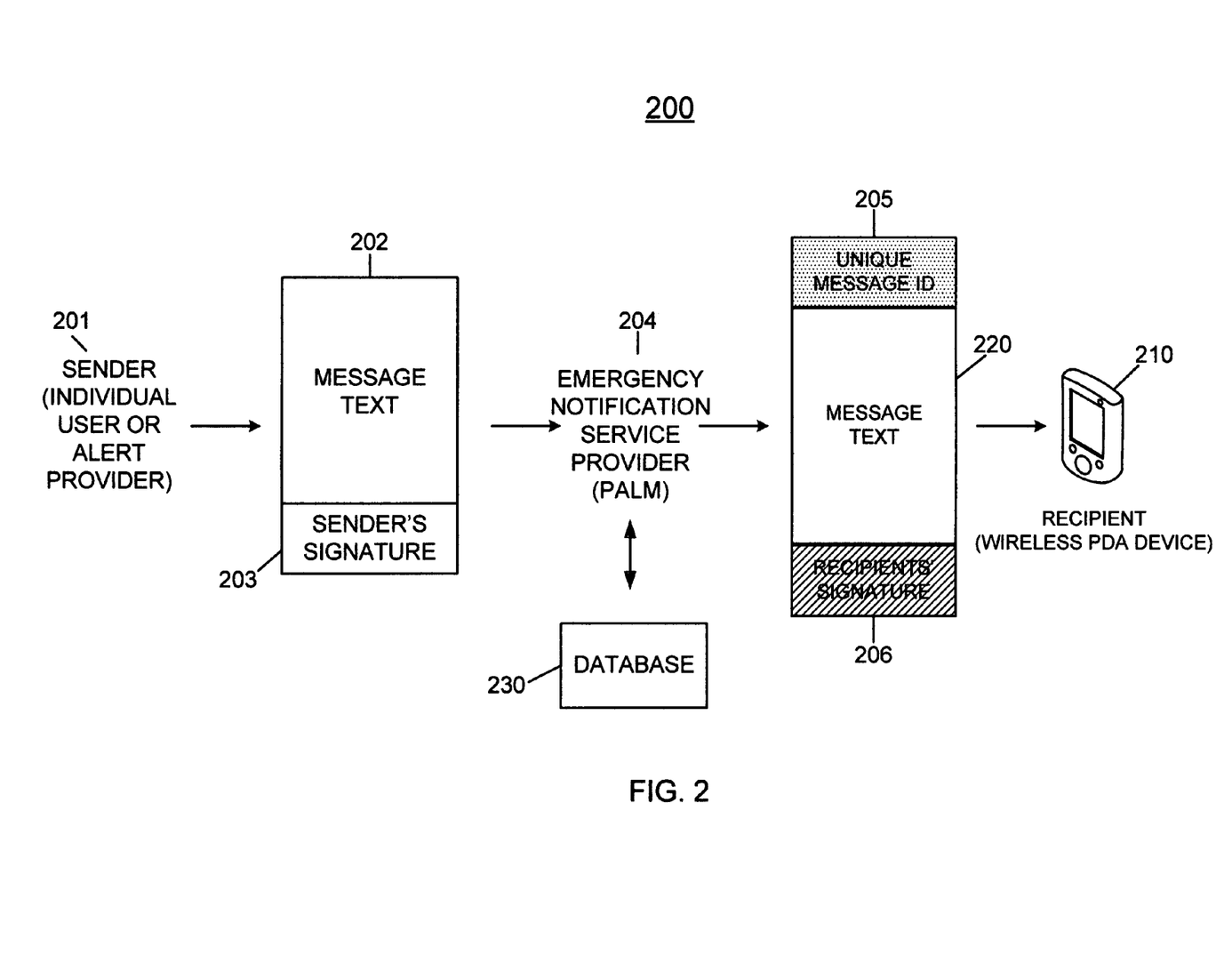
FIG. 2 diagrams the process of a sender transmitting an emergency notification message to a recipient in accordance with one embodiment of the present invention.

FIG. 2 diagrams the process of a sender 201 transmitting an emergency notification message to a recipient 210 in accordance with one embodiment of the present invention.

The sender 201, or a subscribed user (Web user, Alert Provider or Wireless PDA device user), wanting to generate an emergency alert will need to specify the list of recipients (individual subscribers or groups) and the text of the message 202 to be displayed with the emergency alert. To authenticate the message 202, the sender provides his digital signature 203 using a message digest function.

A message digest is a function that generates a unique (or nearly so) pattern of bits for a given input. It generates, a digital fingerprint of the message. Changing any portion of the message would produce a different message digest.

In accordance with the present embodiment, a message digest of the notification message 202 will be generated and encrypted with the sender's private key obtained at the time of registration with service provider 103. The result of this operation is normally referred to as the signature 203 of the message. The "signature" of the notification message 202 is the message digest encrypted with the private key of the sender obtained at the time of registration with service provider 103. The text of the message 202 is not encrypted, only the message digest portion (the "fingerprint") is encrypted.

In the present embodiment, the emergency notification request is the combination of the recipient list, text of the emergency alert and the signature of the message. Upon receiving the emergency notification request (e.g., message 202), the service provider 204 computes the message digest of the text portion of the message 202. It then decrypts the signature portion 203 by using the public key of the sender stored on the database 230. If the unencrypted string matches the computed message digest, then it means that the message 202 has not been tampered with (e.g., the "fingerprints" match) and that the originator of the message used the private key assigned during registration by service provider 204, thus validating the identity of the sender 201.

Provided that the authentication succeeds, service provider 204 will check whether the sender 201 is authorized to send emergency notifications to the list of recipients specified (individuals or group). If the sender 201 is authorized, then service provider 204 generates for each individual recipient subscriber a message 220 consisting of a unique message ID 205 and the original message text and signs it with the subscriber's private key to obtain a signature 206. Each new message 220 is then sent to the appropriate wireless PID device, such as wireless PID 210.

In the present embodiment, upon the arrival of the emergency notification message 220, the wireless PID device 210 will use the subscriber's public key to check the message signature and determine whether the message was originated from the service provider 204 and whether the text of the message has been tampered with. If the message 220 is valid, the PID 210 will use the Unique Message ID 205 included in the message 220 to determine whether the device 210 has already received this particular emergency notification. Duplicate emergency notification messages can be ignored. The PID 210 can keep a list of all processed emergency notification messages, for example, in a local database for future checks.

Thus, the message notification system of the present invention provides a method for authenticating the source of the emergency notification request, thus providing a protection mechanism against from unauthorized sources (spam). The signature of the notification request also provides a guarantee against the tampering of the text of the message. The Emergency Notification Service Provider (e.g., service provider 204) handles the authorization by ensuring that the sender is authorized to issue notifications to the specified recipient(s). Finally, the wireless PID device 210 uses the signature of the message to validate the request, i.e. ensure that it comes from the Alert Provider (e.g., alert provider 106), and that the message has not been tampered with. The Unique Message ID 205 included in the request provides a mechanism for the device to ignore previously processed emergency notifications, thus providing protection against replay attacks.

Figure 3:
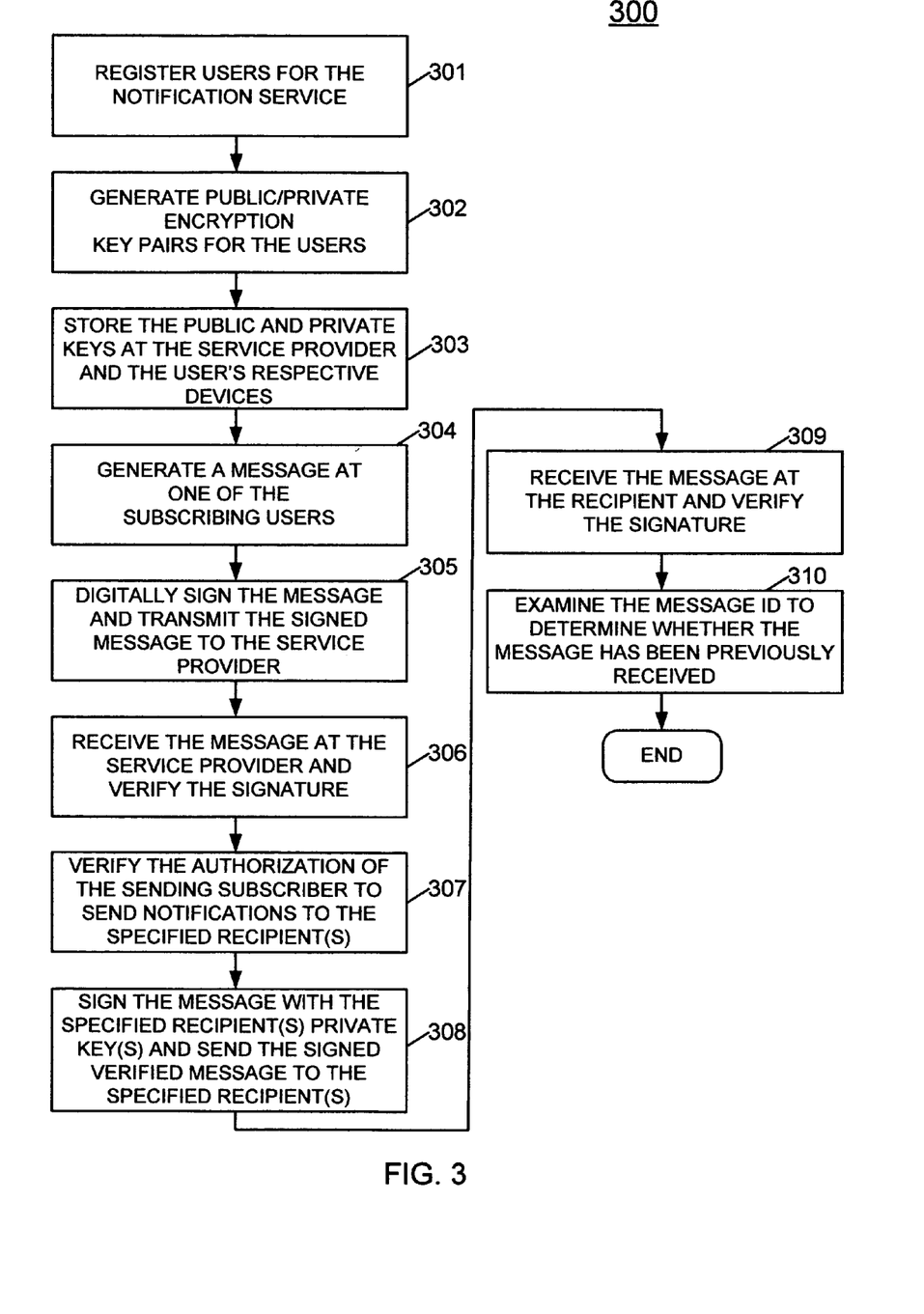
FIG. 3 shows a flowchart of the steps of a registration and notification process in accordance with one embodiment of the present invention.

Referring to FIG. 3, a flowchart of the steps of a registration and notification process 300 in accordance with one embodiment of the present invention is shown. Process 300 shows the steps involved in one or more subscribers registering for the emergency notification service and using the notification service of the present invention.

Process 300 begins in step 301, where a user registers for the notification service of the present invention. As described above, the user can be an owner of a wireless PID (e.g., PID 101 of FIG. 1), an alert provider (e.g., alert provider 106), or a Web user (e.g., Web user 105).

In step 302, upon registration, a public/private key pair is generated by the emergency notification service provider. As described above, one key can be used to encrypt messages while the other key is used to decrypt messages.

In step 303, the public and private keys are stored on the service provider's database and in the user's respective devices. For example, the PID user stores his respective keys within a local database on the PID, the Web user would store his respective keys within, for example, his desktop computer system, and the like.

Referring still to process 300 of FIG. 3, in step 304, a message is generated by a subscriber. In generating the message, the subscriber generates the text of the message, specifies the priority of the message (e.g., emergency, etc.), and specifies the recipient or list of recipients (e.g., individuals subscribers or groups of subscribers) of the message.

In step 305, the message is digitally signed and sent to the service provider (e.g., service provider 103 of FIG. 1). As described above, a message digest is generated and encrypted with the subscribers private key obtained at the time of registration with the service provider. The result of the operation is the signature of the message, which is appended to the message and transmitted to the service provider.

In step 306, the message is received by the service provider and is verified. Upon receiving the message, the service provider computes the message digest of the message and decrypts the signature portion of the message by using the public key of the sending subscriber. As described above, if the unencrypted string matches the computed message digest, the message is considered valid.

In step 307, the service provider verifies the sending subscriber is authorized to send the notifications to the specified recipient or the list of recipients. For example, if the sending subscriber is not authorized for emergency notifications, the message can be discarded.

In step 308, a signed, verified message is then sent to the recipients, encrypted with the sending subscriber's private key. As described above, the service provider generates for each intended recipient a message consisting of a unique message ID, the original message text, and the message signature.

In step 309, the message is received by the recipient and decrypted with the sender's public key to ensure validity. As described above, upon arrival of the emergency notification message, the recipient (e.g., a PID device) will use the recipient's public key to check the validity of the message signature, determine whether the message was originated from the service provider, and determine whether the text of the message has been tampered with.

In step 310, the recipient will use the unique message ID included in the message to determine whether this particular message has been previously received. For example, if the message ID indicates the message has been previously received, the message can be discarded. As described above, the recipient device (e.g., PID) can maintain a list of all processed notification messages in a local database for future checks.

Computer System Environment

Figure 4:
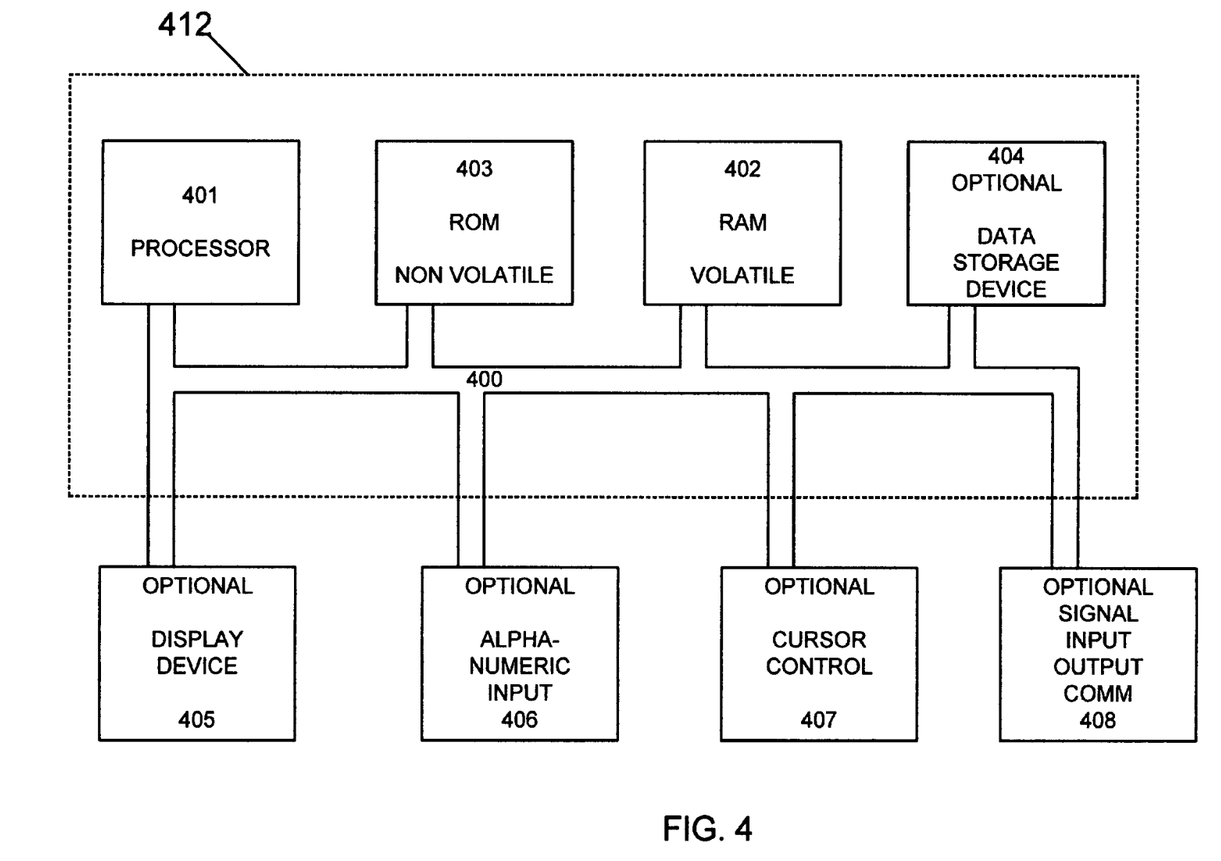
FIG. 4 shows a computer system platform in accordance with one embodiment of the present invention.

Referring to FIG. 4, a computer system 412 is illustrated. Within the following discussions of the present invention, certain processes and steps are discussed that are realized, in one embodiment, as a series of instructions (e.g., software program) that reside within computer readable memory units of system 412 and executed by processors of system 412. When executed, the instructions cause computer system 412 to perform specific actions and exhibit specific behavior which was described in detail above.

Specific aspects of the present invention are operable within a programmed computer system which can function as a personal information device, or desktop computer, or server, or alert provider, or service provider machine. A generalized example of such a computer system operable to implement the elements of the present invention is shown in FIG. 4. In general, the computer system of the present invention includes an address/data bus 400 for communicating information, one or more central processor(s) 401 coupled with bus 400 for processing information and instructions, a computer readable volatile memory unit 402 (e.g., random access memory, static RAM, dynamic RAM, etc.) coupled with bus 400 for storing information and instructions for the central processor(s) 401, a computer readable non-volatile memory unit 403 (e.g., read only memory, programmable ROM, flash memory, EPROM, EEPROM, etc.) coupled with bus 400 for storing static information and instructions for processor(s) 401. System 412 can optionally include a mass storage computer readable data storage device 404, such as a magnetic or optical disk and disk drive coupled with bus 400 for storing information and instructions. Optionally, system 412 can also include a display device 405 coupled to bus 400 for displaying information to the computer user, an alphanumeric input device 406 including alphanumeric and function keys coupled to bus 400 for communicating information and command selections to central processor(s) 401, a cursor control device 407 coupled to bus for communicating user input information and command selections to the central processor(s) 401, and a signal input/output device 408 coupled to the bus 400 for communicating messages, command selections, data, etc., to and from processor(s) 401.

Thus, embodiments of the present invention are directed towards a method and system for event notification for wireless devices. The embodiments of the present invention provide a method for differentiating between such regular notifications and emergency notifications. The embodiments of the present invention provide a method for ensuring a user that a so-called notification is not simply spam. Additionally, embodiments of the present invention provide a method and system for authenticating and authorizing the content service provider to issue such priority differentiated messages. Embodiments of the present invention and their benefits are further described below.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the Claims appended hereto and their equivalents.

What is claimed is:

1. A method of communicating messages, the method comprising:
   receiving a message from a first user of a plurality of users, wherein the message is signed with a first private key of the first user;
   verifying, using a first component, a signature of the message by using a first public key of the first user;
   determining whether said first user is authorized to send said message to a second user of said plurality of users based upon a type of said message;
   signing, using said first component, the message with a second private key of said second user; and
   transmitting the message to the second user for verification using a second public key of the second user.

2. The method of claim 1 further comprising assigning a priority to the message in accordance with a priority indicated by the first user.

3. The method of claim 2 further comprising transmitting the message with the assigned priority to the second user to enable the second user to process the message in accordance with the assigned priority.

4. The method of claim 1 further comprising storing the first and second public keys and the first and second private keys in a database, wherein the database is communicatively coupled to the first component.

5. The method of claim 1 further comprising: generating, using said first component, said first public key and said first private key;
   communicating said first public key and said first private key to said first user;
   generating, using said first component, said second public key and said second private key; and
   communicating said second public key and said second private key to said second user.

6. The method of claim 1 further comprising:
   generating a message digest; and
   encrypting the message digest with the first private key to generate the signature.

7. The method of claim 1 further comprising decrypting the signature using the first public key and a message digest.

8. The method of claim 1 further comprising appending a message ID when transmitting the message to enable the second user to process the message in accordance with the message ID and further to identify duplicate messages.

9. The method of claim 1 further comprising: receiving a list of recipients selected from the plurality of users; and transmitting the message from the first user to the list of recipients.

10. The method of claim 1, wherein the first and second public keys are registered with the service provider, and wherein the first and second private keys are registered with the service provider.

11. The method of claim 1 further comprising verifying that the first user has authority to transmit notification messages.

12. The method of claim 11, wherein the message is not transmitted to the second user if the first user does not have the authority to transmit notification messages.

13. The method of claim 1 further comprising:
   registering said first user and said second user, wherein said registering further comprises generating said first private key and said first public key, and wherein said registering further comprises generating said second private key and said second public key.

14. A non-transitory computer-readable storage medium having computer-readable program code embodied therein for causing a computer system to perform a method of communicating messages, the method comprising:
   receiving a message from a first user of a plurality of users, wherein the message is signed with a first private key of the first user;
   verifying, using a first component, a signature of the message by using a first public key of the first user;
   determining whether said first user is authorized to send said message to a second user of said plurality of users based upon a type of said message;
   signing, using said first component, the message with a second private key of said second user; and
   transmitting the message to the second user for verification using a second public key of the second user.

15. The non-transitory computer-readable storage medium of claim 14, wherein the method further comprises assigning a priority to the message in accordance with a priority indicated by the first user.

16. The non-transitory computer-readable storage medium of claim 15, wherein the method further comprises transmitting the message with the assigned priority to the second user to enable the second user to process the message in accordance with the assigned priority.

17. The non-transitory computer-readable storage medium of claim 14, wherein the method further comprises storing the first and second public keys and the first and second private keys in a database, wherein the database is communicatively coupled to the first component.

18. The non-transitory computer-readable storage medium of claim 14, wherein the method further comprises: generating, using said first component, said first public key and said first private key;
communicating said first public key and said first private key to said first user;
generating, using said first component, said second public key and said second private key; and
communicating said second public key and said second private key to said second user.

19. The non-transitory computer-readable storage medium of claim 14, wherein the method further comprises:
generating a message digest; and encrypting the message digest with the first private key to generate the signature.

20. The non-transitory computer-readable storage medium of claim 14, wherein the method further comprises decrypting the signature using the first public key and a message digest.

21. The non-transitory computer-readable storage medium of claim 14, wherein the method further comprises appending a message ID when transmitting the message to enable the second user to process the message in accordance with the message ID and further to identify duplicate messages.

22. The non-transitory computer-readable storage medium of claim 14, wherein the method further comprises:
receiving a list of recipients selected from the plurality of users; and
transmitting the message from the first user to the list of recipients.

23. The computer-readable medium of claim 14, wherein the first and second public keys are registered with the service provider, and wherein the first and second private keys are registered with the service provider.

24. The computer-readable medium of claim 14, wherein the method further comprises verifying that the first user has authority to transmit notification messages.

25. The non-transitory computer-readable storage medium of claim 24, wherein the message is not transmitted to the second user if the first user does not have the authority to transmit notification messages.

26. A system comprising a processor coupled to a memory, wherein said memory comprises instructions that when executed by said processor implement a method of communicating messages, said method comprising:
receiving a message from a first user of a plurality of users, wherein the message is signed with a first private key of the first user;
verifying, using a first component, a signature of the message by using a first public key of the first user;
determining whether said first user is authorized to send said message to a second user of said plurality of users based upon a type of said message;
signing, using said first component, the message with a second private key of said second user; and
transmitting the message to the second user for verification using a second public key of the second user.

27. The system of claim 26, wherein the method further comprises assigning a priority and a message ID to the message in accordance with a priority indicated by the first user.

28. The system of claim 26, wherein the method further comprises storing the first and second public keys and the first and second private keys in a database, wherein the database is communicatively coupled to the first component.

29. The system of claim 26, wherein the method further comprises:
generating a message digest; and
encrypting the message digest with the first private key to generate the signature.

30. The system of claim 26, wherein the method further comprises decrypting the signature using the first public key and a message digest.

31. The system of claim 26, wherein the method further comprises maintaining a list of authorized recipients the first user is authorized to send notification messages to.

32. The system of claim 26, wherein the method further comprises:
receiving, from the first user, a list of recipients selected from the plurality of users;
checking the list of recipients against a list of authorized recipients for the first user; and
transmitting the message to the list of recipients if the check is successful.

33. The system of claim 26, wherein the first private key and the first public key are registered with the service provider.

34. The system of claim 26, wherein the method further comprises verifying that the first user has authority to transmit notification messages.

35. The system of claim 34, wherein the message is not transmitted to the second user if the first user does not have the authority to transmit notification messages.

36. The system of claim 26, wherein the method further comprises:
generating, using said first component, said first public key and said first private key;
communicating said first public key and said first private key to said first user;
generating, using said first component, said second public key and said second private key; and
communicating said second public key and said second private key to said second user.

* * * * *